Nov. 1, 1955 E. C. HORTON ET AL 2,722,200
WINDSHIELD CLEANER
Filed April 13, 1950
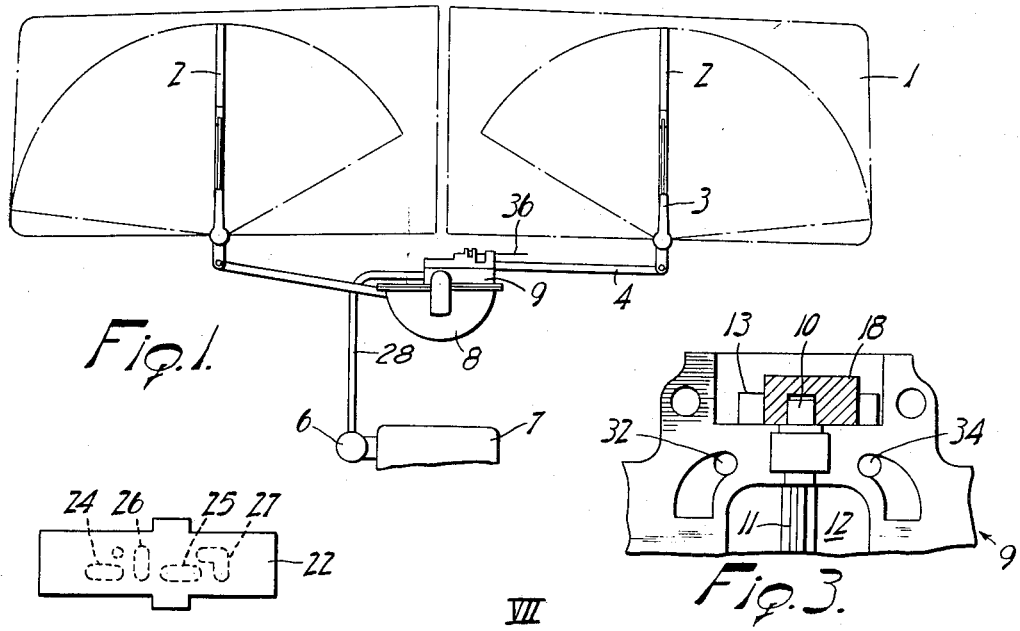
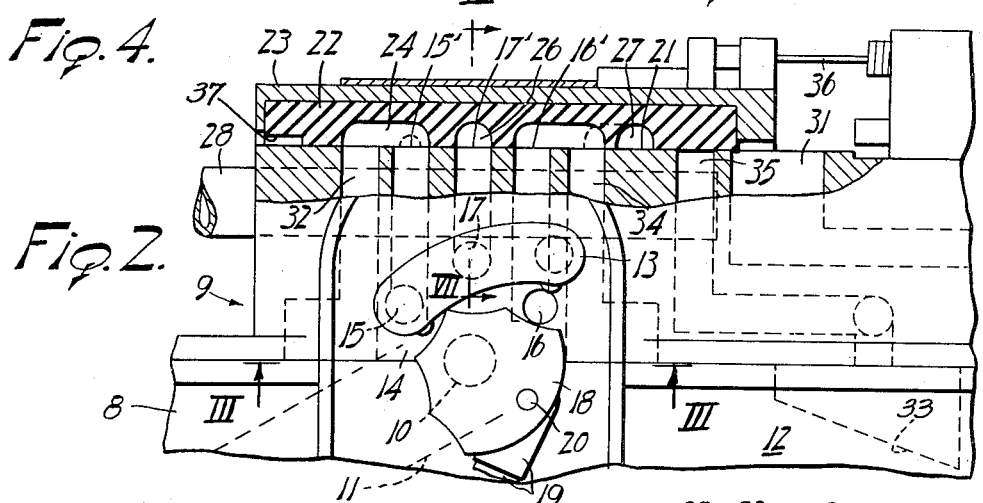
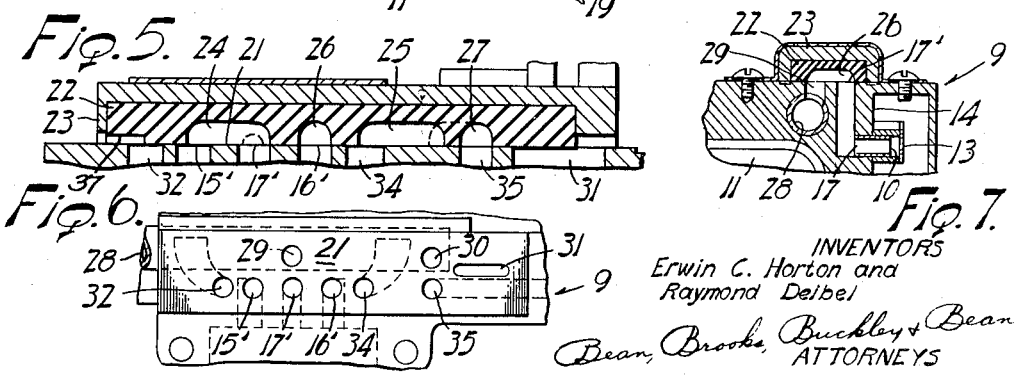
INVENTORS
Erwin C. Horton and
Raymond Deibel
Bean, Brooks, Buckley & Bean
ATTORNEYS United States Patent Office 2,722,200
Patented Nov. 1, 1955

2,722,200

WINDSHIELD CLEANER

Erwin C. Horton, Hamburg, and Raymond Deibel, East Aurora, N. Y., assignors to Trico Products Corporation, Buffalo, N. Y.

Application April 13, 1950, Serial No. 155,736

2 Claims. (Cl. 121—164)

This invention relates to the windshield cleaning art and more specially to the fluid type of windshield cleaner. This type of windshield cleaner is well known in the automotive trade and has long been in use because of its satisfactory and economical performance. The most prevalent construction comprises a casing having an arcuate chamber and a wiper actuating shaft journaled therein and fixedly carrying a vane-like piston to which fluid pressure applications are alternately applied by automatic valve mechanism in effecting shaft oscillation. Its automatic valve mechanism comprises a valve which is oscillated upon a seat to connect a suction supply port alternately to one and then the other of two chamber ports while concurrently uncovering the unconnected chamber port to the atmosphere. The two chamber ports open through passages into the motor chamber respectively at opposite sides of the piston, and one of these passages is extended through a control valve which is designed to park the wiper in an arrested position by directing the suction solely to one side of the chamber only when the cleaner is turned off. This parking arrangement has the effect of making one chamber port passage widely different in capacity and length than the other passage to such an extent as to reflect unfavorably in the performance and function of the cleaner. Especially is this noticeable in the cleaner operation wherein the right and left strokes of the oscillating wiper have uneven movement and therefore lack uniformity in the cleaning efficiency of the two strokes.

The primary object of the present invention is to provide a parking windshield cleaner of the fluid pressure type in which the wiper or blade is given a uniform, rhythmic motion for providing a wiping movement of substantially the same speed in both directions of swing.

A further object of the invention is to provide a fluid pressure windshield cleaner which is fluid parked and when, in operation, has a regular wiping movement of uniform speed throughout tending toward quietness and insuring the greatest efficiency.

The foregoing and other objects will manifest themselves as the following description progresses, wherein reference is made to the accompanying drawing, in which:

Fig. 1 is a diagrammatic layout depicting a windshield cleaner of the pneumatic type in its operative position;

Fig. 2 is an enlarged fragmentary view partly in section and showing the sectional manual control valve in its running position and with the associated passages leading to the automatic valve mechanism;

Fig. 3 is an inverted view of a portion of the casing cover as viewed about on line 3—3 of Fig. 2;

Fig. 4 is a top plan view of the rubber valving element of the manual control;

Fig. 5 is a longitudinal sectional view through the control valve in its wiper parked position;

Fig. 6 is a fragmentary view showing the seat of the control valve in top plan; and Fig. 7 is a reduced cross sectional view about on line 7—7 of Fig. 2.

Referring more particularly to the drawing, the numeral 1 designates the windshield of a motor vehicle, 2 the wiper blades, 3 their actuating arms, and 4 the transmission linkage by which the wiper arms are connected to the motor, the latter having fluid communication by a conduit 28 with the intake manifold 6 of the motor vehicle 7 as a source of operating pressure. Generally, a cleaner motor of this type comprises a casing body 8 and a removable cover 9, a drive shaft 10 journaled in the casing and a vane-like piston 11 fixed on the shaft for imparting oscillatory movement thereto within the arcuate shaped chamber 12 of the casing. Automatic valve mechanism is provided for alternately reversing an operating pressure differential on the piston 11, such mechanism comprising a valve 13, a seat 14 having a pair of chamber ports 15 and 16 and an interposed pressure supply port 17, a kicker 18 mounted on the motor shaft 10, and a spring toggle 19 (shown in fragment) pivotally connected to the kicker by a pin 20. As it is rocked, the valve will uncover one chamber port to the atmosphere and connect chamber port to the supply port 17.

According to the present invention, the two chamber ports 15 and 16 and the pressure or suction supply port 17 open through a second valve seat 21 as ports 15', 16' and 17', respectively, and on this seat slides a control valve 22 supported by a holder 23. The valve face is provided with longitudinal recesses 24 and 25, Fig. 4, and transverse recesses 26 and 27, the latter recesses serving to establish communication with a suction supply line 28 through ports 29 and 30 which also open through the valve seat. Where a windshield washer is employed another port 31 will be provided. A chamber passage 32 leads from the left side of the motor chamber and opens through a port in the seat 21. A like chamber passage 34 leads from the right side of the motor chamber and opens through a port in seat 21.

This differs somewhat from the porting arrangement in the previously used windshield cleaner motors in that the chamber passage to the right side of the motor chamber was made through a parking seat 33 upon which the piston engaged to hold the wiper in a parked or arrested position. This prior use necessitated a longer passage to the right side of the motor chamber than to the left side. The increase in air friction attendant to the longer air passage resulted in a slower movement of the piston in one direction than in the other with a consequential unevenness of wiper movement wherein slow wiper strokes alternated with fast ones. Herein a special parking port or passage 35 is provided between the parking seat 33 and the seat 21. This provides a chamber passage for the right side of the chamber which is equal to the left chamber passage 32 in effect and function. As shown, the two chamber passages 32 and 34 are identical in length and capacity and will be concurrently connected to the chamber ports 15 and 16 by the respective valve recesses 24 and 25 to produce uniform wiper strokes throughout. The ducts leading from the chamber ports are equal in length and size and constitute parts or extensions of the chamber passages to provide uniform communications with the opposite sides of the motor chamber. Therefore, the wiper will have an even rhythmic motion which can be better regulated for effectively maintaining a clear field of vision.

When the control valve is in its parking position, Fig. 5, the transverse recess 27 bridges the parking port 35 and the supply port 30. The control valve may be shifted readily by the push-pull wire 36. A venting recess 37 in the valve 22 will admit atmospheric pressure through chamber passage 32 to expedite the parking action.

The cleaning action of the windshield cleaner is more efficient by reason of its uniform speed of operation and is less tiring on the eyes. By having the chamber passageways equal in length and capacity from the chamber ports to the chamber permits of an increase in capacity relative to a smaller parking port, and while the foregoing description has been given in detail it is without thought of limitation since the inventive principles involved are capable of assuming other physical embodiments without departing from the spirit of the invention and the scope of the appended claims.

What is claimed is:

1. A windshield cleaner motor having a casing with a chamber therein, a shaft journaled in the casing, a piston operatively connected to the shaft to oscillate the latter, automatic valve mechanism for operatively applying a fluid pressure differential to the opposite faces of the piston for oscillating the shaft and comprising a valve seat having two chamber ports and a pressure supply port with passages of equal capacity connecting the chamber ports to the chamber at opposite sides of the piston and a valve movable to connect the supply port alternately to the chamber ports and to uncover the unconnected chamber port to the atmosphere, and a control valve having a seat through which a running port and a parking port open, said supply port and both of said passages likewise opening through the control valve seat, a parking passage leading from the second seat to the chamber at one side only of the said piston, and a valving member slidable on the second seat from one to the other of two positions, in one position to connect the running port to the supply port and in the other position to connect the parking port to the parking passage, said valving member acting in said one position to open the chamber passages and in the other position to close them.

2. In a windshield cleaner, a motor having a casing with a chamber therein, a shaft journaled in the casing, a piston in the chamber operatively connected to the shaft to oscillate the same, automatic valve mechanism having a supply port and two chamber passages leading to the chamber at opposite sides of the piston and a valve movable to connect the supply port alternately to the chamber ports and to uncover the unconnected chamber port to the atmosphere for operatively applying a fluid pressure differential to the opposite faces of the piston, a valve seat having a running port and a parking port, said supply port opening through said seat and said chamber passages each being divided in two with each passage part opening through the seat, a parking passage opening through the seat and communicating with the chamber at one side of the piston, and a valving member slidable on the seat from one to the other of two positions and having recesses one for each chamber passage and which in one position serve to connect the parts of the respective chamber passages together and another recess to connect the supply port to the running port, which valving member interrupting such connections between said passage parts and between said supply port and running port when the valving member is moved to its other position, said valving member having a further recess for connecting the parking passage to the parking port when in said other position, said further recess interrupting the communication with the parking passage when the valving member is in its first position.

References Cited in the file of this patent
UNITED STATES PATENTS

| | | |
|---|---|---|
| 1,738,311 | Oishei et al. | Dec. 3, 1929 |
| 2,298,734 | Buchmann | Oct. 13, 1942 |
| 2,304,279 | Rappl | Dec. 8, 1942 |
| 2,344,949 | Rappl | Mar. 28, 1944 |
| 2,698,607 | Krohm | Jan. 4, 1955 |